US008924529B2

United States Patent
Reno

(10) Patent No.: US 8,924,529 B2
(45) Date of Patent: Dec. 30, 2014

(54) CLIENT DEVICE IDENTIFICATION THROUGH CACHE MANIPULATION

(75) Inventor: James D. Reno, Scotts Valley, CA (US)

(73) Assignee: CA, Inc., New York, NY (US)

( * ) Notice: Subject to any disclaimer, the term of this patent is extended or adjusted under 35 U.S.C. 154(b) by 845 days.

(21) Appl. No.: 13/013,046

(22) Filed: Jan. 25, 2011

(65) Prior Publication Data

US 2011/0185051 A1 Jul. 28, 2011

Related U.S. Application Data

(60) Provisional application No. 61/298,637, filed on Jan. 27, 2010.

(51) Int. Cl.
*G06F 15/173* (2006.01)
*G06F 17/30* (2006.01)

(52) U.S. Cl.
CPC ................ *G06F 17/30876* (2013.01)
USPC ............. 709/223; 709/224; 709/225

(58) Field of Classification Search
CPC ...... H04L 43/04; H04L 43/08; H04L 43/0876
See application file for complete search history.

(56) References Cited

U.S. PATENT DOCUMENTS

| 7,027,807 | B2 * | 4/2006 | Keller ........................... 455/419 |
| 2003/0105847 | A1 * | 6/2003 | Jennery et al. ............... 709/223 |
| 2004/0153884 | A1 * | 8/2004 | Fields et al. ..................... 714/52 |
| 2005/0246634 | A1 * | 11/2005 | Ortwein et al. ............... 715/530 |
| 2008/0189360 | A1 | 8/2008 | Kiley et al. |
| 2010/0245582 | A1 * | 9/2010 | Harel ............................ 348/159 |

OTHER PUBLICATIONS

Kristol D. et al: "HTTP State Management Mechanism", Feb. 1997, XP002179651.
Smith R. M.: "The Web Bug FAQ", Nov. 11, 1999, XP002178943.
Anonymous: "Web bug", Nov. 3, 2007, XP002583117.

\* cited by examiner

*Primary Examiner* — Umar Cheema
(74) *Attorney, Agent, or Firm* — Vierra Magen Marcus LLP

(57) ABSTRACT

A method of identifying a networked client device of a host machine or server includes generating an encoded modified date during a first access attempt by the client device of a server-based object, storing the encoded modified date in a local cache of the device, and processing the encoded modified date during a second access attempt by the client device. A system includes the server and a memory device on which is recorded a server-based object. The server generates and stores the encoded modified date in the local cache, e.g., via HTTP, during the first access attempt of the object by the client device, and processes the encoded modified date during a second access attempt by the same client device to uniquely identify the client device. Restricted information may be provided to the client device upon successful identification.

20 Claims, 1 Drawing Sheet

US 8,924,529 B2

CLIENT DEVICE IDENTIFICATION THROUGH CACHE MANIPULATION

CROSS-REFERENCE TO RELATED APPLICATIONS

This application claims the benefit of U.S. Provisional Patent Application No. 61/298,637, filed on Jan. 27, 2010, which is hereby incorporated by reference in its entirety.

TECHNICAL FIELD

The present disclosure relates to a computer-executable method and an associated system for uniquely identifying a client device which is in networked communication with a server.

BACKGROUND

In a computer network, the identification of a client computing device and/or a user of such a device may be desirable for certain purposes. For example, identifying a user when the user accesses a website allows a server hosting that particular website to provide user-tailored information and client-related services. Likewise, identifying a networked client device may allow tailoring of the content and/or the services provided to the user.

Identification can also be important in the prevention of fraudulent access and other computer-based crimes. Information that is communicated via networked computer devices may be sensitive, and therefore access to certain restricted websites and/or server-based applications may be limited to authorized users. An important requirement for controlling such access is the proper identification of the accessing users and/or their devices.

For example, during an online transaction some systems might use unique numbers, e.g., processor serial numbers or a network interface card Media Access Control (MAC) address, or they might read certain device characteristics such as the operating system, software version(s), processor speed, clock skew, etc. From these values, a profile or "fingerprint" of the networked device may be built and later referenced during subsequent server access attempts.

Cookies with embedded data, shared objects, and similar approaches are also widely used for device identification. Such methods are relatively limited in the sense that, at least in the case of cookies, they may be easily deleted. Other approaches may require the execution of an installed program or a privileged code that may not be easily accomplished via a simple web browser session. Moreover, measuring machine characteristics may be problematic in that multiple networked devices having similar characteristics that may be difficult to distinguish from each other, and/or the characteristics of these devices may change over time due to upgrades or other system modifications.

SUMMARY

The present method and system work together to automatically deposit identification information on a networked client device to accurately identify that device when the device subsequently attempts to access a server, e.g., a hosted web page or other server-based object. The method and system can use existing Hypertext Transfer Protocol (HTTP) caching capabilities or other suitable protocols, with additional encoded modified date information as explained herein, to precisely identify the client device.

In particular, a method is disclosed herein for identifying a networked client device of a host machine or a server. The method includes generating an encoded modified date during a first access attempt by the client device, i.e., during a first attempted access by the client device of a server-based object. The encoded modified date is downloaded from the server and stored in a local cache of the client device. The encoded modified date is then accessed and processed by the server during a second access attempt by the same client device. By comparing the encoded modified date to a reference date, i.e., a database of prior-generated encoded modified dates, the server can uniquely identify the client device.

A system is also disclosed herein that includes the server and process instructions recorded on tangible, non-transitory memory of the server. The server executes the instructions, which allows the server to identify an accessing client device using encoded modified date information. The system is configured for automatically generating the encoded modified date, via the server, during a first access attempt by the client device of a server-based object, and storing the encoded modified date in the local cache of the client device during the first access attempt. The encoded modified date is processed by the server during a second access attempt of the server-based object by the client device to thereby identify the client device.

The above features and advantages and other features and advantages of the present invention are readily apparent from the following detailed description of the best modes for carrying out the invention when taken in connection with the accompanying drawings.

DESCRIPTION

Figure 1:
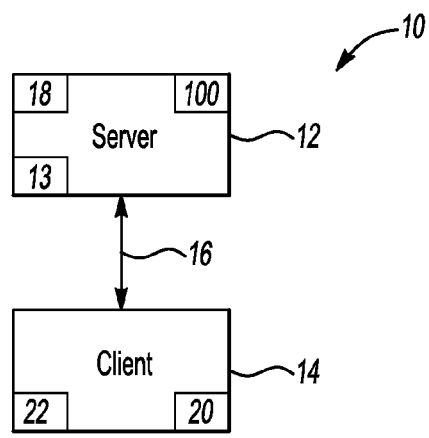
FIG. 1 is a schematic illustration of a preferred a server-based system for identifying a networked client device.

Referring to the drawings, wherein like reference numbers correspond to like or similar components throughout the several figures, and beginning with FIG. 1, a system 10 includes a host machine or server 12. The server 12 is in networked communication with one or more client devices 14, for instance a cell phone or a personal computer. The client devices 14 are adapted for accessing the server 12 over a network connection 16, e.g., the internet, a wide area network (WAN), or a local area network (LAN), in order to request or access an object 18. The object 18 may be embodied, by way of example, as a web page, an image, or an application.

Figure 2:
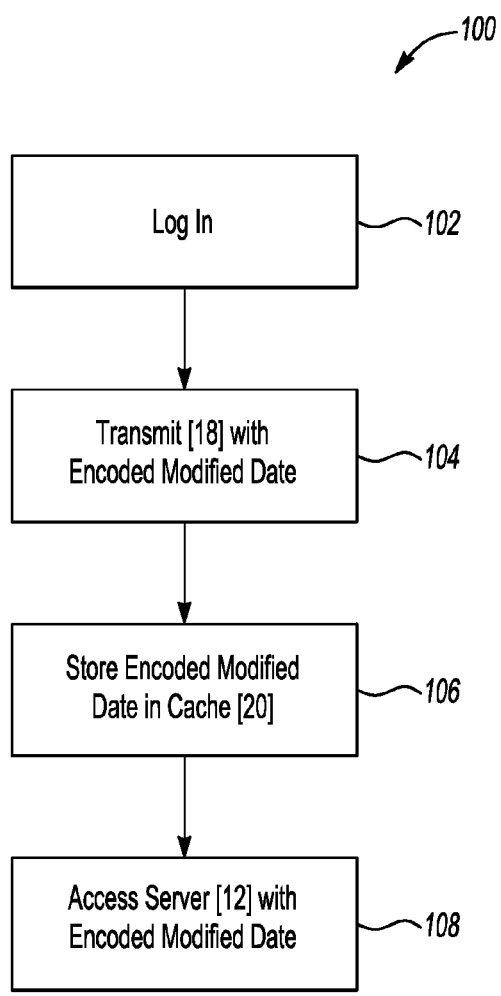
FIG. 2 is a flow chart describing a method for identifying the networked client device within the system of FIG. 1.

The system 10 includes process instructions, i.e., a set of computer-executable code, needed for executing the various steps of the present method 100 (see FIG. 2). The process instructions may be recorded on a tangible, non-transitory memory device 13, and automatically executed by the server 12. Execution of the process instructions from the memory device 13 identifies the particular client device 14 attempting to access the object 18, doing so via automatic cache manipulation. As used herein, the term "automatic cache manipulation" refers to storing and manipulating unique information in a local cache 20 of the client device 14 in the manner set forth below.

Memory 13 is may include any non-transitory (e.g., a tangible) medium that participates in providing computer-readable data or process instructions. Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Memory 13 may also include a floppy disk, a flexible disk, hard disk, magnetic tape, any other magnetic medium, a CD-ROM, DVD, any other optical medium, etc.

The server 12 and the client device 14 may each be configured as digital computer devices, e.g., having a microprocessor or central processing unit (CPU), read only memory (ROM), random access memory (RAM), electrically-erasable programmable read only memory (EEPROM), a high-speed clock, analog-to-digital (A/D) and digital-to-analog (D/A) circuitry, and input/output circuitry and devices (I/O), as well as appropriate signal conditioning and buffer circuitry. Any algorithms resident in or accessible by the server 12 and the client device 14, including any instructions for executing the method 100 described below with reference to FIG. 2, may be stored in memory device 13 and automatically executed by the server 12 to provide the required functionality.

The client device 14 may implement HTTP protocol and a user agent 22 for retrieval of the object 18, and for storage of the same within a local cache 20. As used herein, the term "user agent" refers to software used on the client device 14, e.g., a web browser or any other suitable application that implements HTTP. The term "cache", as understood in the art, refers to a temporary storage area, e.g., aboard each client device 14, which stores frequently-accessed data. The data duplicates original values stored elsewhere aboard the client device 14 and/or the server 12, i.e., data that may be relatively time consuming if recomputed at each required use of the data. That is, loading the object 18 from the local cache 20 of the client device 14 is substantially faster that retrieving the same object 18 from the server 12.

Referring to FIG. 2, with reference to the various elements of FIG. 1, the present method 100 commences at step 102, wherein a user of the client device 14 first logs in to the server 12, i.e., a first access attempt. Step 102 may entail a user of the client device 14 entering a URL address via the user agent 22. The method 100 proceeds to step 104 upon successful login to the server 12. At the completion of step 102, the identity of the client device 14 remains unknown.

At step 104, the server 12 generates an encoded modified date, and transmits the object 18 to the client device 14, with the object 18 having the encoded modified date. This encoded modified date is automatically stored in the local cache 20 of the client device 14 at step 106. The server 12 may also record the encoded modified date in memory device 13 for future comparative reference.

As will be recognized by those of ordinary skill in the art, the HTTP protocol includes mechanisms that support the automatic caching of objects, e.g., the object 18. According to this protocol, an object should be retrieved from a local cache only if the present version of that object is not newer than the cached version. When a server first sends an object to a client device, the server specifies a modified date for that object. The client device then stores the object in its local cache along with the specified modified date.

In a subsequent request for the same object, a client device includes in its request the modified date associated with the object. The server uses this information to determine whether the locally-cached version should be used, or whether a new version should be used. In its response to the client device, the server either tells the client device to use the cached version of the object, or it sends a new version of the object to the client device along with a new "modified date". HTTP supports this by using an "If-Modified-Since" request header, but one of ordinary skill in the art will recognize that similar approaches are possible using other protocols.

Therefore, the server 12 uses the HTTP caching capability to embed an encoded modified date uniquely identifying the client device 14 within the context of the overall system 10. That is, the server 12 automatically encodes, within the existing HTTP modified date scheme, unique information that identifies the client device 14. The server 12 determines the setting of the encoded modified date and whether or not to set a new object 18. The client device 14 stores the information and acts as instructed by the server 12.

In one embodiment, the content of the object 18 may be random or nonessential. For example, the object 18 could be a small randomly generated image on a web page, e.g., a unique 1 pixel×1 pixel digital image that is randomly selected or generated. During the first interaction with the client device 14, the server 12 could transmit this random image, along with a modified date. Instead of providing meaningful date information, this information merely encodes a unique date-based identifier for the client device 14. This type of encoding could use different date and time values to represent different networked devices. For example, the date "Dec. 1, 2009 12:00:34" might identify one client device 14, while "Dec. 1, 2009 12:00:35" might identify another.

In another embodiment, the content of object 18 may be meaningful, and might contain significant amounts of useful data. For example, one type of object 18 that can be cached via local cache 20 is a script file, e.g., JavaScript or another form of code that is understood by the client device 14. Other examples include Java Applets. Such a file contains code that is run by the client device 14. On the first interaction between the client device 14 and server 12, the server can build the file containing arbitrary code and data, possibly including unique identification data, and then transmit it to the client device where it is locally cached.

At step 108, the client device 14 subsequently attempts to access the server 12, i.e., a second access attempt. When the client device 14 requests the object 18 from the server 12, the request includes the now-encoded modified date field. The server 12 therefore knows that the request originates from a specific client device 14, e.g., by comparing the encoded modified date from the client device 14 to a version recorded in the memory device 13 during the first access attempt. The server 12 could reply by telling the client device 14 to use the locally-cached object 18, in which case the modified date and identification would not change.

Alternately, the server 12 could reply with a new object and modified date if the server 12 determines that it is necessary to update the device identification. Upon successful identification of the client device 14, the server 12 could transmit a set of user-restricted information, e.g., financial records, personal information, etc., from the server 12 to the client device 14.

In a subsequent access, the server 12 could direct the client device 14 to use the cached version of the object 18. The code and data in the cached object 18 could then produce a unique device identification that is transmitted or communicated to the server 12 in a subsequent request. The code itself could contact the server 12 and interact with the server 12, possibly to further identify the client device 14 and/or its user. This approach may avoid issues with cookie clearing and the disabling of cookies from third-party domains. It may also allow identification of a given client device 14 within a single domain, or across different domains.

While the best modes for carrying out the invention have been described in detail, those familiar with the art to which this invention relates will recognize various alternative designs and embodiments for practicing the invention within the scope of the appended claims.

The invention claimed is:

1. A method comprising:
   receiving a first access request at a server from a client device over a network;
   generating, by the server, an encoded modified date for a server-based object in response to the first access request, wherein the encoded modified date comprises a unique identifier for the client device;
   transmitting the server-based object with the encoded modified date from the server to the client device over the network;
   storing, at the server, the encoded modified date that comprises the unique identifier for the client device with different encoded modified dates for the server-based object that comprise unique identifiers for other client devices;
   receiving, during a second access request at the server from the client device that is subsequent to transmitting the server-based object to the client device, a request for the server-based object by the client device, the request for the server-based object comprises a request whether a present version of the server-based object that is newer than the encoded modified date is available; and
   identifying the client device at the server by matching the encoded modified date in the request for the server-based object with the stored encoded modified date that comprises the unique identifier for the client device.

2. The method of claim 1, wherein the transmitting the server-based object with the encoded modified date from the server to the client device over the network comprises:
   using caching capability of a communication protocol used to transmit the server-based object to the client.

3. The method of claim 1, wherein the transmitting the server-based object with the encoded modified date from the server to the client device over the network comprises:
   encoding the unique identifier for the client device within a modified date scheme of a communication protocol used to transmit the server-based object the client.

4. The method of claim 1, wherein the request for the server-based object by the client device comprises an "If-Modified-Since" request header that comprises the encoded modified date.

5. The method of claim 1, wherein the first access request is a login request, the second access request is a subsequent login request.

6. The method of claim 1, wherein the transmitting the server-based object with the encoded modified date from the server to the client device over the network comprises:
   generating an image as the server-based object; and
   transmitting the image and the encoded modified date to the client device.

7. The method of claim 1, wherein the server-based object comprises code.

8. The method of claim 1, wherein the client device comprises a user agent configured to retrieve the server-based object and to cache the server-based object within local cache on the client device.

9. A system comprising:
   a processor; and
   a tangible, non-transitory memory device coupled to the processor, the memory device comprising instructions which when executed by the processor, cause the processor to:
   receive a first access request from a client device over a network;
   generate an encoded modified date for an object in response to the first access request, wherein the encoded modified date comprises a unique identifier for the client device;
   transmit the object with the encoded modified date to the client device over the network;
   store, in the memory device, the encoded modified date that comprises the unique identifier for the client device with other encoded modified dates for the object that comprise unique identifiers for other client devices, wherein each of the client devices is assigned a unique encoded modified date for the same version of the object;
   receive, during a second access request from the client device that is subsequent to transmitting the object to the client device, a request for the object by the client device, the request for the object comprises a request whether a present version of the object that is newer than the encoded modified date is available; and
   identify the client device by matching the encoded modified date in the request for the object with the stored encoded modified date that comprises the unique identifier for the client device.

10. The system of claim 9, wherein the instructions that cause the processor to transmit the object with the encoded modified date to the client device over the network cause the processor to:
    use caching capability of a communication protocol used to transmit the object to the client device.

11. The system of claim 9, wherein the instructions that cause the processor to transmit the object with the encoded modified date to the client device over the network cause the processor to:
    encode the unique identifier for the client device within a modified date scheme of a communication protocol used to transmit the object the client.

12. The system of claim 9, wherein the request for the object by the client device comprises an "If-Modified-Since" request header of an HTTP protocol that comprises the encoded modified date.

13. The system of claim 9, wherein the first access request is a login request, the second access request is a subsequent login request.

14. The system of claim 9, wherein the instructions that cause the processor to transmit the object with the encoded modified date to the client device over the network cause the processor to:
    generate an image as the object; and
    transmit the image and the encoded modified date to the client device.

15. The system of claim 9, wherein the object comprises code.

16. A system comprising:
    a processor; and
    a non-transitory memory device coupled to the processor, the memory device comprising instructions which when executed by the processor, cause the processor to:
    receive a first login request from a first client device over a network;

generate a first date and time value for a server-based object in response to the first login request, wherein the first date and time value comprises a unique identifier for the first client device;

transmit the server-based object with the first date and time value to the first client device over the network;

store, in the memory device, the first date and time value that comprises the unique identifier for the first client device with other date and time values for the server-based object that comprise unique identifiers for other client devices, wherein each client device is assigned a unique date and time value;

receive, during a login access request from the first client device that is subsequent to transmitting the server-based object to the first client device, a request for the server-based object by the client device, the request for the server-based object comprises a request whether a present version of the server-based object that is newer than the first date and time value is available;

identify the first client device by matching the first date and time value in the request for the server-based object with the stored first date and time value that comprises the unique identifier for the first client device;

transmit the same version of the server-based object with a second date and time value to a second client device during a login process for the second client device, the second date and time value uniquely identifies the second client device; and identify the second client device based on the second date and time value in a request from the second client device for a present version of the server-based object.

17. The system of claim 16, wherein the instructions that cause the processor to transmit the server-based object with the date and time value that comprises the unique identifier for the client device cause the processor to:
cause the client device to cache the server-based object with the date and time value that comprises the unique identifier for the client device.

18. The system of claim 16, wherein the instructions that cause the processor to transmit the server-based object with the date and time value that comprises the unique identifier for the client device cause the processor to:
encode the unique identifier for the client device within a modified date scheme of a communication protocol used to transmit the server-based object the client device, the modified date scheme is used to determine whether a newer version of the server-based object is available.

19. The system of claim 16, wherein the request for the server-based object by the client device comprises an "If-Modified-Since" request header that comprises the date and time value that comprises the unique identifier for the client device.

20. The system of claim 16, wherein the instructions that cause the processor to transmit the server-based object with the date and time value that comprises the unique identifier for the client device cause the processor to:
generate an image as the server-based object; and
transmit the image and the date and time value to the client device.

* * * * *